2,890,983
Patented June 16, 1959

2,890,983

EXCIPIENT

Pierre Louis Victor Monot, Dijon, France

No Drawing. Application July 30, 1957
Serial No. 674,997

Claims priority, application France July 31, 1956

4 Claims.  (Cl. 167—58)

The object of the present invention is a novel excipient for dermatological uses, i.e. a non-therapeutical substance which enters into the composition of products such as balsams, creams, ointments, pomatums, oils, sticks, having medical properties or not, for the care of the skin.

The new excipient is characterised in that it is essentially formed of a mixture of the product known under the trade name "Labrafil" which is the product resulting from the transesterification reaction between a polyoxyethylene glycol and natural hydrogenated glycerides (such as palm oil), as described in the French patent application filed on March 10, 1956, Serial No. 710,245, by Emile Mahler and Marcel Gattefosse, entitled: "Surface Active Agent Obtained From Triglycerides and Polyethylene Glycol," with a partially hydrogenated mixture of animal and vegetable triglycerides.

The "Labrafil" promotes the percutaneous absorption the diffusion of the medicinal principals incorporated therein and the mixture as a whole is hydrodispersible whereas the triglycerides are not.

The fact that some components are hydrogenated allows of preserving the mixture for an indefinite time.

The novel excipient is unique mainly in that it is anhydrous, capable of high penetration, non-deteriorating, fatty and yet capable of being washed away with water; other properties of this excipient will appear hereinafter.

The mixture preferably comprises from 15 to 50% "Labrafil" and 85 to 50% triglycerides, although these proportions are not to be considered as limiting the invention in any way.

The finished product is in the form of a soft unctuous grease of outstanding plasticity.

As the "Labrafil" is to be found on the market, it is simply necessary, in manufacturing the present excipient, to prepare the mixture of triglycerides. This mixture can be formed, for example, of copra oil, of sperm oil and palm oil, in equal parts. This mixture is partially hydrogenated, while hot, at a temperature of the order of 200° C. and under a pressure of the order of 4.5 kg./cm.², in the presence of a catalyst, such as activated nickel (reduced and pulverulent) for a period of four hours.

Once these constituents are made, for example 2 kg. of "Labrafil" and 8 kg. of the triglyceride mixture are melted at a temperature of the order of 50° C. and are stirred while maintaining this temperature until a perfect mixture is obtained. This mixture is allowed to cool and to rest for about 24 hours so that it can crystallize. When the hardness of the mixture (measured by the Mahler penetrometer) reaches about 1800, the mixture is ground, for example in a three-cylinder mill, so as to obtain an unctuous product the hardness of which is only about 120.

As an alternative, once the hot mixture of the two constituents has been obtained, the same can be continuously stirred until it is completely cool. An unctuous excipient is thus obtained directly, i.e. without the necessity of a grinding operation.

In either case, the excipient is packed, preferably in metal casks, and is thereafter supplied to pharmaceutical laboratories and to chemists so that they can carry out their prescriptions.

The present excipient is fatty, hydrophilic, and non-ionic. It has all the advantages of fatty excipients without their drawbacks. Its percutaneous penetration is much higher than that of fatty excipients, being of the same order as that of emulsified excipients.

Active liposoluble or hydrosoluble principals are very easily incorporated therein. It dissolves, when hot, liposoluble products. It incorporates, when cold, at least its own weight of water.

Since the excipient according to the invention is prepared from natural substances which can entirely be absorbed by the skin, its percutaneous penetration is substantially enhanced by its highly hydrophilic, wetting and emulsifying properties.

It improves the contact with integuments, emulsifies the sebum and thus opens all the channels of transcutaneous pentration which becomes excellent. It is miscible with various secretions (nasal, lachrymal, etc.), therefore it adheres to the mucous membranes. It can be washed away with cold water so that the skin can be freed of all traces of pomatum and wounds can be easily cleaned. It is non toxic, non irritant and non-reacting. It is sterile and non-deteriorating.

It is to be understood that this invention is not limited to the examples given above.

I claim:

1. An excipient for dermatological uses comprising a mixture of the product resulting from the transesterification reaction between a polyoxyethylene glycol and natural hydrogenated glycerides, with partially hydrogenated animal and vegetable triglycerides.

2. An excipient in accordance with claim 1 wherein the partially hydrogenated animal and vegetable triglycerides is a mixture of partially hydrogenated copra oil, sperm oil and palm oil.

3. An excipient for dermatological uses comprising a mixture of between 15 to 50% of the product resulting from the transesterification reaction between a polyoxyethylene glycol and hydrogenated glycerides of vegetable origin, with about 85 to 50% of a mixture of partially hydrogenated animal and vegetable triglycerides.

4. An excipient in accordance with claim 3 wherein the mixture of partially hydrogenated animal and vegetable triglycerides is a mixture of partially hydrogenated copra oil, sperm oil and palm oil.

References Cited in the file of this patent

UNITED STATES PATENTS

| | | |
|---|---|---|
| 1,970,578 | Schoeller | Aug. 31, 1934 |
| 2,149,005 | Bockmuhl | Feb. 28, 1939 |

OTHER REFERENCES

Fiero: J.A.P.A., Sci. Ed., vol. 29, No. 1, pp. 18–23 (reprint).

J.A.P.A., Prac. Ed., April 1946, pp. 158–160.

Atlas, Surface Active Agents, Atlas Powder Co., Wil., Del. Copyright 1948, 70 page brochure, esp. at Table No. 1, (opp. p. 26), Table II (opp. p. 27).